United States Patent Office 2,751,308
Patented June 19, 1956

2,751,308
CEMENT PAINT

Artil Arrighini, Southfield Township, Oakland County, Mich., assignor to Rocwall Company, Detroit, Mich., a corporation of Michigan No Drawing. Application October 25, 1954, Serial No. 464,619

1 Claim. (Cl. 106—98)

The present invention relates to cement paint.

It is an object of the present invention to provide a composition in the form of a powder adapted to be mixed with water to the proper consistency for application as a cement paint, and characterized essentially by the inclusion of a substantial amount of short fiber asbestos.

Other objects and features of the invention will become apparent as the description proceeds.

It is found that the inclusion of substantial amounts of short fiber asbestos has the result of causing cement paint to adhere firmly to concrete, cinder block, or the like surfaces. Furthermore, the paint made in accordance with the present invention has the property of producing an extremely smooth continuous surface, eliminating porosity, and causing the paint to operate very efficiently as a filler for not only small pores but also relatively larger breaks, or porosity, or irregularities in the painting surface.

It has also been found that the material made in accordance with the present invention when applied to a surface not only adheres permanently to the surface, but also provides a secondary surface to which other materials such for example as plaster, may be applied and to which the plaster will adhere permanently.

In the industry asbestos is classified as asbestos fibre and asbestos shorts. Where the expression "short fiber asbestos" is used herein, reference is made to asbestos shorts. Asbestos is classified as a result of testing on "Quebec Standard Testing Machines" which separate a one pound sample of fibre by successive screening on ½", ¼", and ⅒" mesh screens. The amount of material passing successively through the screens, and remaining in the pan are then listed. Minimum test for "asbestos fibre" is 0–0–7–9. The highest test asbestos shorts test 0–0–5–11.

Authority for the foregoing classification is contained on page 1, effective May 17, 1954, superseding page 1 of June 22, 1953, of the price book of the Philip Carey Manufacturing Company of Detroit, Michigan.

In order that the present invention may be practiced there is set forth a table showing a typical composition:

| | Pounds |
|---|---|
| White cement | 150–225 |
| Lime | 75–175 |
| Sand (very fine) | 25–75 |
| Sand (40–60 mesh) | 75–125 |
| Asbestos (short fiber) | 5–25 |

The ingredients may be varied for different results so long as a substantial proportion of short fiber asbestos is included. In general, the quantity of asbestos will be between 1 percent and 5 percent of the total weight of the composition.

It will of course be understood that the composition may be varied by the inclusion of various coloring materials without affecting its efficient operation.

The foregoing specification constitutes a description of the improved cement paint in such full, clear, concise and exact terms as to enable any person skilled in the art to practice the invention, the scope of which is indicated by the appended claim.

What I claim as my invention is:

A composition for producing a cement paint by the addition of water, consisting of:

| | Pounds |
|---|---|
| White cement | 150–225 |
| Lime | 75–175 |
| Sand (very fine) | 25–75 |
| Sand (40–60 mesh) | 75–125 |
| Asbestos (short fiber) | 5–25 |

References Cited in the file of this patent
UNITED STATES PATENTS

| 1,374,161 | Hathaway | Apr. 5, 1921 |
| 1,595,897 | Lewis | Aug. 10, 1926 |
| 2,433,450 | Grant | Dec. 30, 1947 |
| 2,644,771 | Kempthorne | July 7, 1953 |